April 16, 1968 F. R. HERTRICH 3,378,827

DIRECT ACCESS DATA STORAGE

Filed May 24, 1965 4 Sheets-Sheet 1

INVENTOR.
FRIEDRICH R. HERTRICH

BY George E. Roush

ATTORNEY

April 16, 1968 F. R. HERTRICH 3,378,827

DIRECT ACCESS DATA STORAGE

Filed May 24, 1965 4 Sheets-Sheet 2

April 16, 1968 F. R. HERTRICH 3,378,827

DIRECT ACCESS DATA STORAGE

Filed May 24, 1965 4 Sheets-Sheet 4

3,378,827

DIRECT ACCESS DATA STORAGE

Friedrich Rudolph Hertrich, San Jose, Calif., assignor to International Business Machines Corporation, Armonk, N.Y., a corporation of New York Filed May 24, 1965, Ser. No. 458,134
14 Claims. (Cl. 340—174.1)

The invention relates to the automatic storage and retrieval of data, and it particularly pertains to a direct access data storage of high capacity and flexibility of storing data on a multiple of comparatively short non-cyclic type records and in which each of the records is selectively presentable to a recording and reproducing transducer of a type compatible with the type of record.

In the prior art there is a data storage comprising a rectangular bin, having a multiple of cells each containing a multiple of records, movable in two directions at right angles relatively to a transducer, such as shown in U.S. Patent No. 3,176,279, issued March 30, 1965, for "Data Storage Apparatus," in the names of Andrew D. Lin, Dennis D. Willard and Donald D. Johnson. There is another data storage in the prior art in which a bin of a multiple of cells arranged in annuloidal form is rotated in a single degree of freedom with respect to the transducer. Both of these prior art arrangements are start-stop mechanisms which require precise positioning of the entire bin with respect to the transducer at the time the latter is operating. For large quantities of data, considerable power is required to accelerate a large bin and to decelerate it into the precise cell position required for transducing.

An object of the invention is to provide a data storage requiring a minimum of power to drive the bin.

Another object of the invention is to provide a direct access data storage in which the detenting of the cell carrying the data is both simple and accurate.

A further object of the invention is to obviate the disadvantage of positioning a large mass to an accurate discrete location.

Still another object of the invention is to provide a direct access data storage having the advantage of "look-ahead" retrieval, thereby shortening the access time.

Still another object of the invention is to provide a direct access data storage of very large capacity in a minimum physical volume.

According to the invention, a direct access data storage comprises a base member on which there is arranged a bin of generally circular form having a multiple of compartments opening inwardly for containing tubular cells of rectangular cross-section configuration and open at the top for storing a plurality of records, the entire assembly forming an annuloidal solid of revolution. The bin assembly is arranged for continual rotation in a given direction with respect to the base member. A data transducing station is located centrally of the bin in fixed relationship to the base member. A curved track is arranged to convey a cell from the rotating bin to a translating station and then on back to the rotating bin. Cell identifying data, preferably in the form of a magnetic record on the cell, is read and compared with an address in an address register to actuate a cell selecting mechanism. This mechanism engages the cell and the track, the curvature of which withdraws the cell from the bin. Initially, the tangential force of the rotating bin sends the cell along the track to the translating station at which conventional mechanism is provided for locating and withdrawing a record, transducing data as desired and replacing the record in the cell. At the completion of the translating operation, the cell identifying data record is picked up and sent through suitable circuitry to a cell compartment relocation station. A cell returning arm assembly, pivoted at a point within the bin and off the center of rotation, normally rests with the outer end of the arm at the relocating station. At each cell compartment there is a returning arm engaging device which is shifted at the relocating station if a cell is to be restored thereat. This device engages the restoring arm assembly and rides over a cammed surface on the arm assembly to accelerate the arm from zero up to a speed synchronous with the rotation of the bin. The arm urges the cell along the track into the selected compartment of the bin.

The cell is restored in the bin through a combination of tangential and centrifugal force, the latter of which holds the cell in the bin upon completion of the restoring operation. As the cell approaches the vacant cell compartment in the bin, it is maintained in the necessary alignment by another camming surface on the restoring arm and urged outwardly into the cell compartment by the track to a point where the restoring arm is no longer needed. At this point the restoring arm engaging device riding on a further camming surface is released allowing the arm to swing back to the initial point under the urging of suitable resilient means.

Further, according to the invention, a standing station is arranged along the track between the selecting station and the translating station and controlled transporting means are arranged for shifting a cell from the standing station to the translating station on demand.

Still further, according to the invention, a resting station is arranged along the track between the translating station and the restoring station and the controlled transporting means are arranged to remove the last cell translated from the translating station to the resting station to await the action of the returning arm.

Thus, one record in a cell can be translated with a succeeding cell waiting at the standing station to be translated and in a preceding cell at the resting station or still on the way back to the bin, resulting in greatly decreased access time.

In order that the practical aspects of the invention may be readily attained in practice, a specific embodiment of the invention, given by way of example only, is described hereinafter with reference to the accompanying drawing, forming a part of the specification and in which.

As an example of a direct access data storage according to the invention, there follows a description of apparatus for recording data on pliant strips coated with magnetic material for recording data on and reproducing data therefrom by means of a cyclic transducer of the type shown and described in the U.S. Patent 3,176,279 mentioned above. It should be clearly understood that data storage apparatus according to the invention will be readily adapted by those skilled in the art to other forms of data records as desired; for example, cards, strips of tape and the like.

Figure 1:
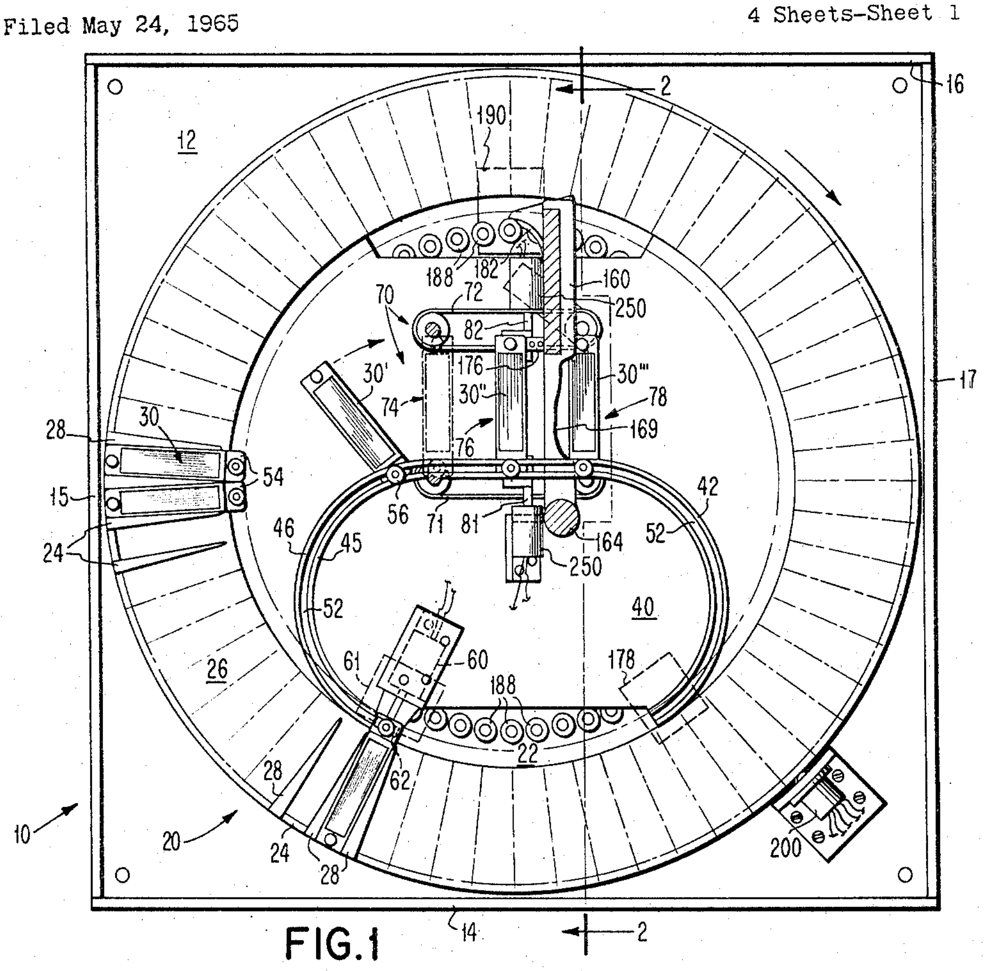
FIG. 1 is a view of an embodiment of the invention explanatory of the overall concept.
Figure 2:
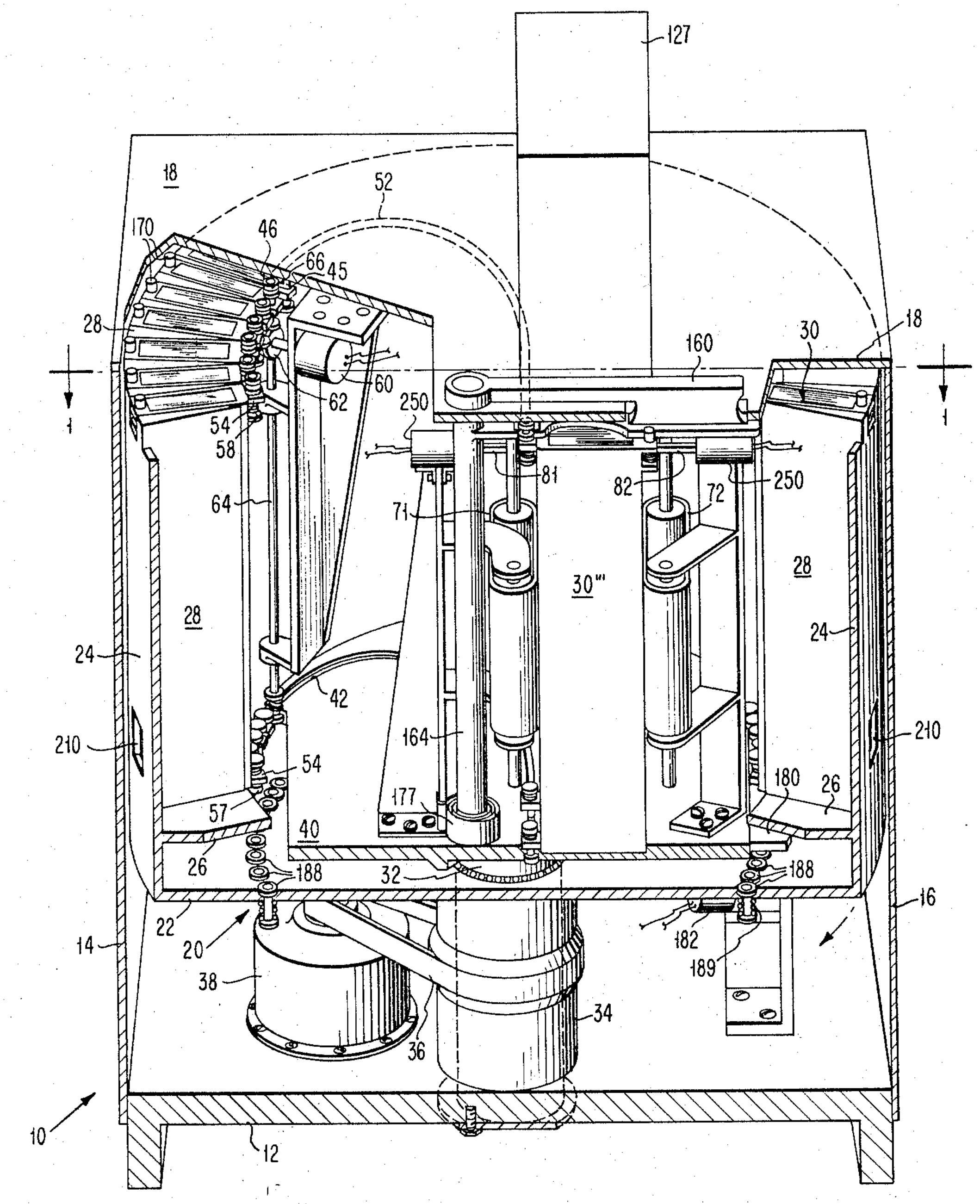
FIG. 2 is a cross-section taken along the line 2—2 to provide an elevation view of the explanatory embodiment.

FIGS. 1 and 2 show a data storage according to the invention contained in a housing or cabinet 10 comprising a base 12, four side panels 14–17 and a header 18. FIG. 1 is a plan view taken at the lower geometrical plane surface of the header 18 as indicated by the cross-section lines 1—1 of FIG. 2 and detailed to show the functional essentials of the structure according to the invention. FIG. 2 is an elevation view partly in perspective and partly in cross-section taken along line 2—2 in FIG. 1.

Referring both to FIGS. 1 and 2, a bin 20 of cylindrical periphery comprises a bottom header 22, a tubular wall 24, an annular floor 26 and a multiple of fins 28 radially dividing the bin 20 into a multiple of compartments, 64 being shown, into which a multiple of cells 30 fit snugly. Geometrically, the bin 20 and cells 30 in place form an annuloidal solid of revolution. A shaft 32 is fixed in the base 12 to support the bin 20 by means of a sleeve 34 fastened to the bottom header 22 arranged by means of suitable bearings (only the upper bearing being shown) so that the bin and the sleeve 34 may rotate about the shaft 32. A belt 36 and an electric motor 38 fixed to the base 12 are arranged to rotate the bin 20 continuously in a predetermined direction, clockwise, for example. It is contemplated that a bin 28 inches in diameter and approximately 12 inches in height be driven at a speed of 120 r.p.m. although other sizes and speeds will be suggested to those skilled in the art.

The cells 30 are held in the cell compartments of the bin 20 by centrifugal force due to rotation of the bin. It is suggested that a magnetic catch arrangement of moderate strength also be used to enhance this holding of the bin in the compartments when the bin 20 is at a standstill.

A base plate 40 is fixed to the upper end of the fixed shaft 32 within the bin 20 so that the bin 20 rotates about the base plate 40. The accessing arrangement according to the invention is mounted in and on the base plate 40 and also supported on the header 18. A lower curved raceway in the form of an inverted T-shaped slot 42 of substantially ovoid form, preferably with an intermediate straight portion as shown, is milled into the base plate 40. A pair of rails 45 and 46 are fastened to the under surface of the upper header 18 to provide a parallel erect T-shaped raceway 52 of the same configuration as the lower raceway 42. The two raceways 42 and 52 jointly constitute a track over which the cells are conveyed.

Each cell has a pair of trunnions 54 at either end in which spring loaded, track engaging devices, shown as spring loaded pins, 56 and 57 are arranged. Normally, the springs 58 bias the track engaging pins 56, 57 toward the center of the cell 30 so that the heads of the pins clear the tracks 42 and 52 and the cells 30 remain in the bin 20 as it rotates. By conventional means, shown in the interest of simplicity only as a rotary solenoid 60 of conventional construction, located at a selecting station 61, a cam 62 is rotated in response to the functioning of addressing circuitry to raise the upper pin 56 and by means of a rod 64 to depress the lower pin 57 simultaneously so that the heads 66 slip into the track slots 42 and 52. The continuous movement of the bin 20 forces the selected cell denoted 30' to move along track slots 42 and 52, thus withdrawing the selected cell 30 from the bin 20. Both the tangential force of the moving bin 20 and the momentum of the cell 30' carry the latter along the track. Due to tangential force, the outer wall is rotated clockwise about the pins 56, 57 of the inner wall. As the cell 30' proceeds along the track, it encounters and is arrested by a cell transporting mechanism 70 comprising a pair of belts 71 and 72 among other things. The belts 71, 72 preferably are arranged for lightly gripping a cell in transporting it, but readily slipping over the cell when it is held at a station. Known arrangements are available to those skilled in the art, for example, a belt transversely ribbed with soft material. The selected cell 30' is urged gently to a stop by the movement of the belts 71, 72 at a standing station 74 in which it remains until further demand by the control circuitry to be moved into a translating station 76. At the translating station, the cell, now denoted 30'', is precisely positioned, by means of detenting guides 81 and 82, beneath a record handling mechanism. A detector in the guide structure (not shown in FIGS. 1–4) is arranged to stop the belt driving means when the cell 30'' is in position. Such a detector is available to those skilled in the art and will not be discussed here.

Neither the record handling mechanism nor the records themselves are a part of the invention. It may comprise known means, for instance, that shown in U.S. Patents 3,126,008, issued Mar. 24, 1964, in the name of Jay R. Geddes, and 3,176,279, above mentioned, for locating, withdrawing and replacing a magnetic record strip in the cell 30'' and recording and/or reproducing data therefrom, as required.

In the example illustrated, each cell 30 contains a plurality (ten, for example) of individual record strips 90 disposed with the planar surfaces thereof parallel to the motion of the cell. The strips 90 are similar except for the position of an ear portion 92. In each cell 30 the ear portion 92 of the strips 90 are located differently, preferably in an offset relation relative to each other to facilitate the selection of a desired strip by the particular strip selection device illustrated and described later in the specification.

Figure 3:
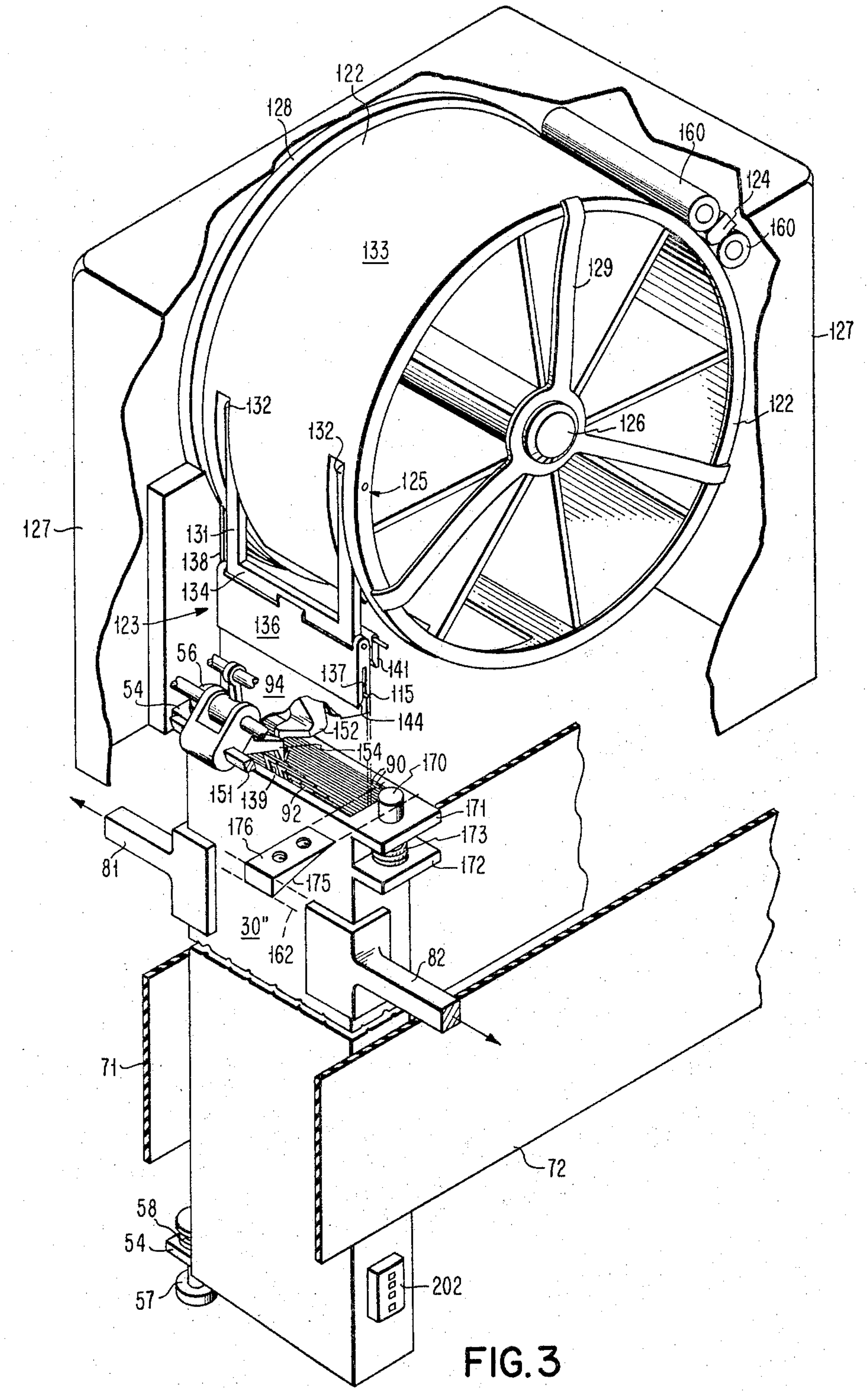
FIG. 3 shows further details of the apparatus according to the invention.

The upper portion of one record strip may be seen in FIG. 3. The strip 90 shown in the example in use is approximately 1⅝ inches wide, 11 inches long and 0.005 inch thick with a magnetizable surface 94 on one side. The base material of the strip may be a flexible material such as polyethylene terephthalate, more commonly identified by the registered trademark Mylar. However, the particular details of the record and the record handling apparatus form no part of the invention in and of itself; any suitable record known in the art may be employed.

The strip 90 is capable of storing seventy parallel recording tracks with each track capable of recording ten thousand binary bits of information. In the apparatus disclosed, characters are recorded serially by bit and by character along parallel tracks extending normally to the free edge of the strip. Assuming a character is definable by seven binary bits, ten tracks are provided on each record strip 90, each having the capacity of storing ten thousand separate data characters in addition to control characters. Each strip 90 therefore is capable of storing 100,000 characters plus control information; each cell 30 therefore stores 1,000,000 characters and each bin, as illustrated, stores sixty-four cells. Hence, the complete bin assembly, with sixty-four cells as illustrated, has a capacity of 1.92 billion separate seven-bit characters. The physical space occupied by the bin array is less than 2½ feet square by 2½ feet high.

While the invention in and of itself does not include the record selector and transducer, the arrangement shown, which has been chosen to illustrate the invention, comprises generally a rotatable drum member 122, a device 123 carried by the drum for picking a selected strip 90 from a cell 30'', wrapping it upon the drum 122 and returning it to the cell 30'', and a read/write transducer unit 124 mounted in data transferring relationship to the strip 90 when it is wrapped on the drum 122. The drum member 122 is mounted on a shaft 126 which is disposed in suitable bearings (not shown) in the housing 127 for the translating station. The drum 122 rotates on an axis which is concentric to the axis of the shaft 126 and is provided with a circumferential flange 128 for referencing a record strip 90 axially of the drum. Suitable biasing means for urging the strip 90 to this flange comprise a spider-type spring 129.

A selected strip 90 is retracted from a cell 30″ and wrapped on the drum by the strip picking device 123 which as carried by the drum 122. The drum has a portion of its circumferential surface recessed to allow the picking device 123 to be positioned below the surface during rotation. A U-shaped member 131 with arms 132 is mounted in the drum 122 for swinging movement about an axis 125 which is disposed parallel to the drum shaft 126 and radially of the curve surface 133 of the drum. A picker body 136 carries a comb-like latch member 137 mounted for rocking motion relative to the picker body 136. Pieces of the comb-like latch member 137 are spaced in accordance with the spacing of the pickup holes 139 in the offset ear portion 92 of the strips which are stored in each cell 30″. The comb-like latch member 137 is spring biased to a position wherein each tooth cooperates with a portion of the pickup body 136 to form a jaw-like latch. A spring biased, pivotally mounted strip release bar 141 actuated by a cam plate is also provided for releasing the comb-like latch member 137.

A strip picking device 123 in the ready position lies parallel to the plane of the strips occupying each cell 30″ and is disposed on a path defined by the guide 138. The distal edge of the pickup body 136 is provided with a V-shaped slot 144 for guiding the selected strip 90 into engagement with the latch member 137. The strip selecting unit includes a pair of stationary guide rods 151 which, in the embodiment shown, are fixedly attached to the housing 127. The guide rods 151 are spaced apart in this plane in a direction transverse to the axis for a distance which allows the strip picking device 123 to pass through. A separator arm 152 is slidably mounted on each guide rod 151 for movement along the axis of the rod. The distal ends 154 of the arms are offset relative to each other in the axial direction for a distance slightly greater than the width of one ear portion 92 of the strip and are ganged together for joint movement along the axis of their respective guide rods 151. Separator arms 152 are also mounted for triple movement in opposite directions about the respective guide rods 151 and are biased to positions shown wherein their distal ends 154 overlap and lie on opposite sides of the frame containing the strip picking device 123.

The strip selection mechanism further includes a means for conjointly moving the separator arms axially to position the offset arms 152 on opposite sides of the ear portion 92 of the selected strip 90 so that upon rotation of the separator arms 152 in the downward direction, the upper portion of the strips 90 on both sides of the selected strip are bent away from the selected strip thereby presenting only one strip 90 to the strip picking device 123. Further details of these strip picking positioning means are discussed in the previously mentioned U.S. Patent No. 3,176,279.

In picking a selected strip, the drum 122 is first rotated to a predetermined latching angle to cause the picking unit 123 to latch onto the selected strip **90*s*. Rotation of the drum 122 is then reversed which causes the strip to be retracted from the cell 30″ and wrapped on the drum 122 which has a circumference slightly less than the length of the strip so that the end portion of the strip overlaps the free edge 115 which is held by the picker body 136. Suitable strip guides in the form of rollers 160 are provided adjacent the drum 122 to insure compliance of the strip 90*s* to the drum surface on opposite sides of the transducer unit 124. The drum may be rotated clockwise for any desired number of complete revolutions so that the tracks on a record strip 90 are presented to the transducer unit 124 in a cyclic fashion. Upon completion of the data transferring operation by a transducer unit, the rotation of the drum is again reversed at a predetermined angular location which corresponds to the end portion of the strip being positioned adjacent the guide surface formed by the housing 127. Rotation of the drum 122 returns the strip 10 to its original position in the cell 30″ after which the rotation of the drum 122 is again reversed to bring the drum through the predetermined angle to the ready position. Thereafter, the next strip may be selected from the same cell 30″ or the standing cell 30′ may meet and the translating cell 30″** may be transported to the next station.

The cells 30′, 30″ and 30‴ are transported by means of the belts 71 and 72 driven by conventional means in response to conventional control. Cell 30″ is moved from the translating station to a resting station, where it is identified as cell 30‴. So moving, the cell 30‴ must pass beneath a restoring arm 160 having portions 161 and 162, respectively, above and below the header 18 which has an annular segmental slot arranged therein to accommodate a web portion 163 between the upper and lower portions of the restoring arm 160.

Figure 4:
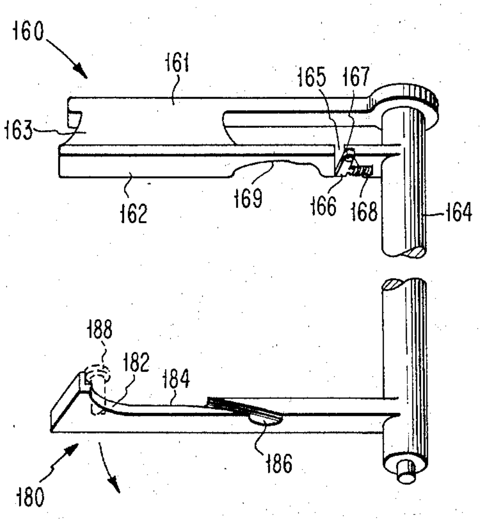
FIG. 4 is an illustration of the restoring arm of the explanatory embodiment of the data storage according to the invention.

Additional details of the restoring arm 160 are better seen in FIG. 4 which is a view somewhat below and behind the restoring arm 160 in the home position. The upper portion 161 of the arm is pinned to a shaft 164 journaled in the header 18 and in the base plate 40 for rotation thereby permitting the restoring arm 160 to swing about the center of the shaft 164. A slot 165 divides the lower portion 162 of the restoring arm into an element depending from the web 163 and another element extending from the shaft 164. A gate 166 is pivoted by means of a pin 167 and urged by means of a coil spring 168 to close the slot 165. The forward surface of the gate 166 (hidden in the view) is flush with the forward edge of the lower portion 162 of the restoring arm 160 so that the upper slot or track engaging pin device 56 may be propelled forward by the subsequent movement of the restoring arm 160. Track engaging device or pin 56 moves into an especially contoured camming surface 169 in the restoring arm 160. This camming surface is arranged to guide the cell 30‴ in the proper alignment, with the cell 30‴ being reinserted into the bin 20 between a pair of fins 28, 28. The inner edges of the fins 28 may also be shaped to provide camming surfaces that urge the cell 30‴ more readily into the desired compartment.

In order that the cell 30‴ may be properly propelled forward and guided into the rotating bin 20 by means of the restoring arm 160, a pin 170 is arranged to slide up and down in a pair of trunnions 171 and 172 (better seen in FIG. 3). A spring 173 biases the pin 170 in the uppermost position. As the cell 30‴ leaves the translating station 76, the pin 170 is depressed by means of a camming surface 175 of a generally wedge-shaped member 176 fastened to the under surface of the header 18 in such position that the pin 170 is thereby depressed to permit it to pass under the depending portion 162 of the restoring arm 160. The cell 30′ has thus been propelled underneath the restoring arm 160 to the resting station 78 at which the cell is now identified as cell 30‴. In this position the cell 30‴ is positioned forward of the restoring arm 160 in readiness to be propelled along the tracks or raceways 42, 52 to the restoring station 178 at which the cell will be completely reinserted or returned to the rotating bin 20.

The restoring arm 160 may be driven and synchronized with a rotating bin by a number of suitable means suggested to those skilled in the art. In the simple and efficient preferred embodiment shown in FIGS. 1 and 4, a driving arm 180 is affixed to the shaft 164 below the bottom header 22 of the bin 20. The driving arm 180 has a camming surface 182 at the outer part of the undercut track surface portion 184 leading to a dropoff slot 186. The track portion 184 is preferably undercut as shown to accept the head of a driving pin 188. There is a driving pin 188 for each of the compartments 26 into which a cell 30 fits. Springs 189 bias the driving pins 188 downwardly in the normal mode so that they clear the driving arm 180. At a relocating station 190 means are provided for urging the pin 188 passing above the station 190 upward. Suitable means for this purpose will be suggested to those skilled in the art, but a rotary solenoid 182, only the lower part of which is shown in FIG. 2, again shown in the interest of simplicity only, is arranged in the manner of the selecting station rotary solenoid 60 to drive a cam in response to conventional control means to drive the pin 188 upward permitting the head of the pin 188 to engage the track portion 182 of the driving arm 180 at the outermost end of the arm.

Referring to FIG. 1, it will be noted that the drive shaft 164 is located off center of the rotating bin 20 at such dimensions taken in connection with the curve of the camming surface 182 that the pin 188 on the moving bin 20 strikes the arm 180 and begins driving the arm with a very low rate of angular velocity; the driving is gradually increased until the arm is moving completely synchronously with the rotating bin 20. A spirally wound spring 177 near the lower end of shaft 164 (better seen in FIG. 2) urges the shaft 164 to the home position against the stop formed by the wedge-shaped member 176 while at the same time permitting the shaft 164 to rotate about 180° from the home position. The point of the driving arm 180 at which the pin 188 bears is now moving at the speed of the rotating bin 20 so that the rotating shaft 164 is substantially synchronous with the rotating bin 20. The cell is guided by the restoring arm 160 so that the cell 30''' is maintained in synchronous alignment due to the trailing pin 56 of the cell bearing on the camming surface 169 in the lower portion 162 of the driving arm 160. As the cell 30''' begins entering the compartment 26 corresponding to the engaged pin 188, that pin passes through a dropout slot 186 and releases the arm to be restored to the home position by means of the spiral spring 177. Further movement of the rotating bin 20 and guidance of the raceways 42, 52 complete the return of the cell 30''' into the rotating bin 20.

Conventional circuitry and mechanisms will be suggested to those skilled in the art for controlling the operation of the hereinbefore described apparatus in either an "on-line" or an "off-line" mode. For example, an array 200 of electromagnetic transducers arranged more or less vertically is used to detect the particular cells or compartments of the rotating bin as they pass this point. Preferably, the indicating indicia are arranged on the cells 30, as shown in FIG. 3, and made convenient to the transducer array 200 by means of windows 210 in the wall 24 of the rotating bin 20. In this manner, cells may be removed from the bin and other cells with other indicating indicia may be inserted and detected wherever they are placed in the bin. Also, up to three cells more than the bin holds may be used, in which case the transducer array detects only an empty compartment for returning a cell. It is also contemplated that the bin or wall portions thereof be made of non-magnetic material, such as aluminum or magnesium, and permanent magnetic indicia corresponding to the compartments be inserted to be read by suitable electromagnetic transducers. The cells may be made of magnetic shielding material, such as mu-metal and the magnetic indicia inserted in a base 202 of non-magnetic material. In the interest of compactness, transducers may be located in the four corners of the cabinet as is the one transducer array 200 shown. If desired, transducers may be located within the rotating drum on the base plate 40 or suspended from the header 18 or in other ways by means readily available to those skilled in the art.

The operating cycle of the apparatus hereinbefore described comprises a sending phase, a translating phase, and a returning phase. The sending phase encompasses operation at the selecting station 61 from which the cell 30' is sent to the standing station 74 and thereafter shifted as cell 30'' to the translating station 76. In the returning phase, the cell 30''' is removed to the resting station in response to selection of a compartment at the relocating station 190 and removing of the cell from the resting station 78 to complete return of the cell 30''' to the rotating bin 20 at the restoring station 178. The transition of the cells from the standing station to the translating station 76 for transducing and then to the resting station 78 is accomplished by the transport mechanism 70.

Figure 5:
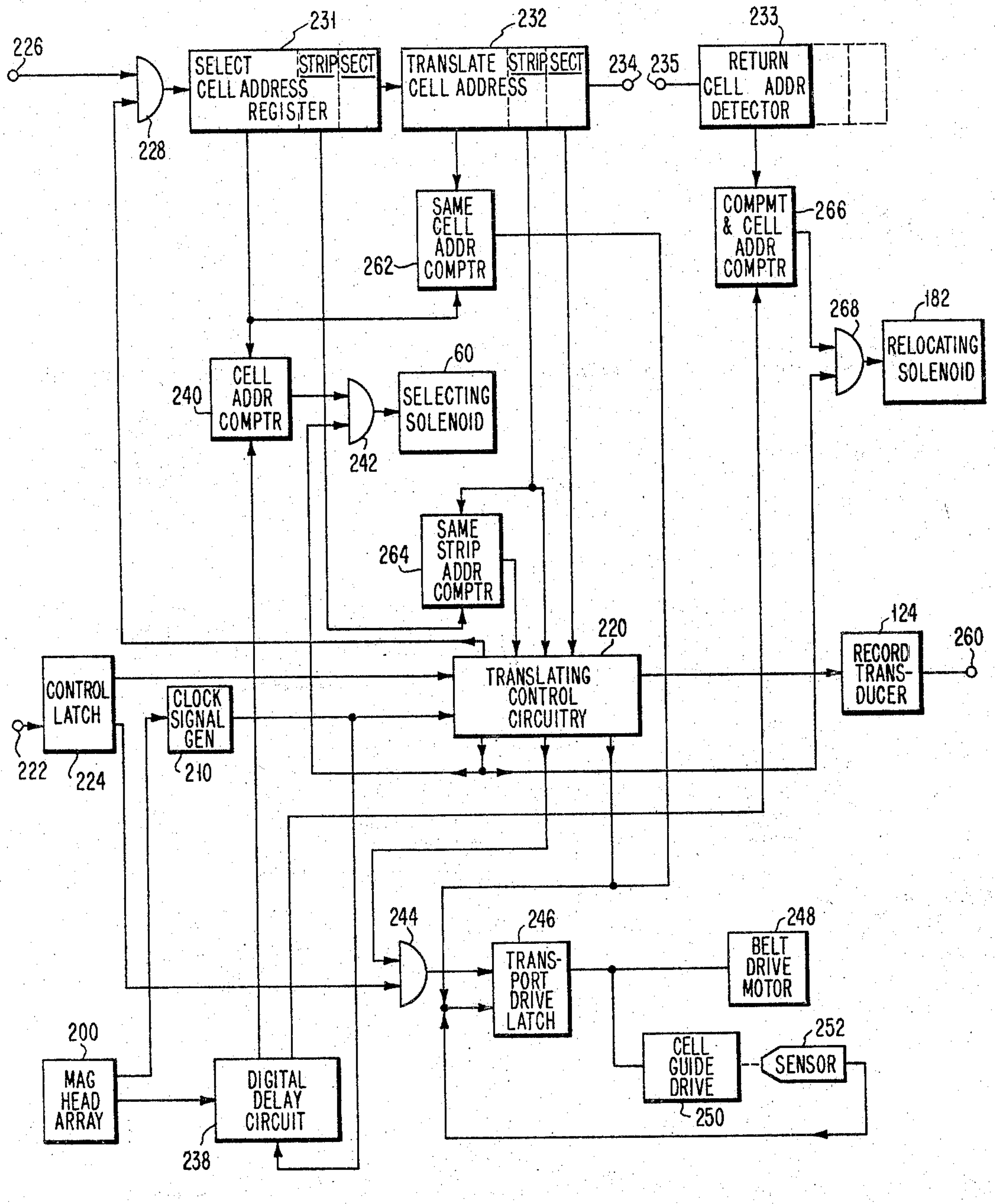
FIG. 5 is an illustration of a fundamental embodiment of control apparatus for the given explanatory embodiment of the invention.

The functioning of the apparatus is synchronized with the rotating bin by gating pulses from the transducer array 200 or other independent transducers used to pick up the passing of the cell or compartment indicia and applying them to pulse regenerating circuitry 210, shown in FIG. 5, of known configuration for producing a clock signal.

The functional diagram shown in FIG. 5 is but one of many that will be suggested to those skilled in the art. It contains the fundamental circuitry for utilizing the apparatus of the invention, but there are many ways in which it may be simplified, added to or otherwise adapted for the data processing system at hand as it will be readily recognized by those skilled in the art that the associated data processing system will govern. For the hereinbefore described apparatus, translating control circuitry 220 responsive to control signals from the associated control processor applied at input terminals 222 to a control latch 224 is arranged for gating address data appearing at input terminals 226 in a gate 228 during the strip and sector selecting phase of translation. The address signals are applied to a shift register shown as comprising two stages 231 and 232. A third stage (shown by similarity of the block 233) may be used with the terminals 234 and 235 interconnected, but preferably an electromagnetic return cell address detector 233 located at the resting station 78 is used as will be described hereinafter. The identifying data of the cell to be selected is located in the most significant portion 231–C of the first register stage 231 and the data is read from the cells themselves as they pass the magnetic head array 200 and applied through a digital delay circuit 238 to compensate for the difference in location along the periphery of the bin between the head array 200 and the selecting station 61 to cell address a comparator 240. When a comparison is made, the output of the comparator 240 and a gating level from the translating control circuitry raise a gate 242 for energizing the selecting solenoid 60. At the same time, a gate 244 is raised to activate a transport drive latch 246, energizing a motor 248 for driving the cell transport mechanism 70 and simultaneously energizing a cell guide drive 250 for releasing any cell 30'' at the translating station 76 and later for detenting any subsequent cell from the standing station 74 precisely at the translating station 76. In this example, the selecting solenoid 60 engages a cell 30' in the track. If there is no cell already in the transport mechanism (a rare occurrence in practice), the selected cell will be transported without stopping at the standing station to the translating station where a detent detector 252 will act to drop the transport drive latch 246 turning off the motor 248. Usually there is a cell in the standing station 74 at least and this cell will effectively stop the motor 248 as just described leaving the last selected cell at the standing station 74. No detenting is necessary at this station; the cell merely stands in the position at which the drive belts 71, 72 hold it when the motor 248 stops. Likewise, any cell in the translating station is simply moved under the restoring arm 160 to a position in front of the arm 160 which is the resting station 78. A slight delay in stopping the motor 248 after the cell 30'' is detented will insure that the cell 30''' is completely in front of the arm 160, the belts 71, 72 being arranged to slip over the cell 30'' as mentioned before.

The translating circuitry is arranged to pass through the transducing phase wherein the electromagnetic transducer 124 records on or reproduces from the record as described with respect to the data at a terminal 260 leading from and to the central processing unit.

A same cell address comparator 262 compares the address portions of the registers 231 and 232. If the succeeding record is in the same cell as the last record, the transport drive latch is triggered to prevent the operation of the motor 248 and the cell guide drive 250. Similarly, a same strip address comparator 264 serves to hold the translating mechanism controlled by the translating control circuitry 220 to the same strip.

An electromagnetic head array arranged at the resting station 78 constitutes the return cell address detector 233. Alternatively, the same function could be performed by a third stage of the shift register, as previously mentioned. The identity of the cell 30''' to be returned to the bin is compared in a comparator 266 with either the detecting of a vacant compartment or the address of the designated compartment generated by the head array 200 and applied through the digital delay circuit again to compensate for the difference in location around the bin. The output of the comparator 266 is applied through a gate 268 to activate the relocating solenoid 182 at the relocating station 190. Thus, one cycle is completed.

While one accessing arrangement has been shown and described, it is contemplated that two or more accessing arrangements can be provided for a single large rotating bin. It is also contemplated that two or more standing stations can be provided by elongating the track and the drive belt arrangement.

While the invention has been shown and described in terms of an express preferred embodiment, it should be clearly understood that those skilled in the art will make the suggested and various other changes in the apparatus without departing from the spirit and scope of the invention as defined in the appended claims.

The invention claimed is:

1. A direct access data storage, comprising
a base,
a multiple of tubular cells,
a plurality of data records in each of said cells,
a bin arranged for holding said cells in an annuloidal configuration,
driving means for continually rotating said bin about the axis thereof in a given direction with respect to said base,
a data translating station having a selector for selecting a record from a cell and a transducer for translating data to and from said record, and
means for conveying a cell from said bin to said translating station and on back to said bin,
said translating station being arranged internally of said annuloidal bin,
said conveying means comprising
a truck arranged on said base and leading from a selecting station at one point along the path traversed by said bin past said translating station to a restoring station at another point on said path,
a cell selector arranged at said one point along said path for switching a desired cell to said track,
a selected cell being propelled along said track due to rotation of said bin,
detenting structure at said translating station for arresting said selected cell for operation of said record selector,
a cell returning structure normally resting adjacent a cell to be returned, and
cell returning structure enabling means corresponding to each location and selectively positionable for enabling said cell returning structure to propel said selected cell along said track to a further point at which said selected cell is restored by rotation of said bin.

2. A direct access data storage, comprising
a base,
a multiple of tubular cells,
a plurality of data records in each of said cells,
a bin arranged for holding said cells in an annuloidal configuration,
driving means for continually rotating said bin about the axis thereof in a given direction with respect to said base,
a data translating station having a selector for selecting a record from a cell and a transducer for translating data to and from said record, and
means for conveying a cell from said bin to said translating station and on back to said bin,
said translating station being arranged internally of said annuloidal bin,
said conveying means comprising
a track arranged on said base and leading from a selecting station at one point along the path traversed by said bin past said translating station to a restoring station at another point on said path,
a cell selector arranged at said one point along said path for switching a desired cell to said track,
a selected cell being propelled by tangential force along said track to said translating station,
detenting structure at said translating station for arresting said selected cell for operation of said record selector,
a cell returning arm normally resting with one end adjacent said bin at still another point on said path, and
arm engaging structures arranged on said bin at each location and selectively positionable for engaging said arm for propelling said selected cell along said track to a further point at which said selected cell is restored by rotation of said bin.

3. A direct access data storage, comprising
a plurality of data records,
a multiple of cells for storing said records,
a bin having a multiple of compartments for storing said cells and the records therein,
a selecting station,
a translating station,
a relocating station, and
a restoring station,
all fixed in spacial relationship to said bin with the compartments continuously cycling by said selecting station, said relocating station and said restoring station and with said translating station located centrally of the other stations,
data translating apparatus at said translating station,
cell conveying apparatus extending from said selecting station through said translating station to said restoring station, for moving a cell out of said bin, into said translating station and back into said bin, while cells are continuously cycling, including
a restoring mechanism extending to said relocating station and operative to accelerate a cell from standstill to synchronism with said cycling cells, and
means for selecting a desired cell, conveying said desired cell to said translating station, enabling said translating apparatus, enabling said relocating station and in turn said restoring mechanism for restoring said desired cell in said bin.

4. A direct access data storage, comprising
a casing of hollow annular form having a multiple of longitudinally disposed compartments of rectangular cross-section opening into the interior of said casing,
means for continually rotating said casing in a given direction about the longitudinal axis thereof,
a multiple of tubular cells of rectangular cross-section open at the top and fitting in said compartments of said casing, and held there substantially by centrifugal force,
data records in each of said cells,
a data translating station arranged internally of said casing and the cells in said compartments,
means for guiding a selected cell from said casing to said translating station,
means for selecting a cell and loading the same into said guiding means and propelling the same to said translating station substantially by tangential force,
data transducing apparatus at said translating station for translating data to and from said records,
said means for guiding a cell extending back to said casing for restoring a selected cell therein,
further means for powering the restoring of said selected cell extending to a further location passed by said casing,
means on said casing actuated at said further location for enabling said further means for restoring said selected cell, and
electric circuit means for coordinating the functioning of said data storage.

5. A direct access data storage comprising
record data translating apparatus,
a multiple of cells, each containing a plurality of records,
a bin of annuloidal configuration continually rotating in a given direction and having compartments for said cells radially of the longitudinal axis,
means for identifying said cells carried thereby, and
means for conveying said cells from said bin to said translating apparatus and return,
said cell conveying means being located internally of said bin,
said data translating apparatus being located at a data translating station internally of said bin,
said conveying means being arranged for selecting cells at a predetermined location with respect to the path of said bin and returning cells at another relatively predetermined location with respect to the path of said bin,
a standing station located along said transferring means between said cell selecting station and said translating station,
a resting station located along said transferring means between said translating station and said other predetermined location,
means for restoring a cell to said bin at said restoring station,
a relocating station is arranged along the path of said bin between said predetermined locations and means arranged thereat for actuating said restoring means,
means at said resting station for reading the identifying means on a cell thereat for operating said actuating means at said relocation station,
said restoring means being arranged to accelerate the cell at said resting station from zero to synchronism with said rotating bin, and
means at said other predetermined location for restoring said cell to said rotating bin.

6. A direct access data storage, comprising
a bin of annuloidal configuration having a central longitudinal cylindrical axis and a multiple of compartments arranged radially of said axis,
means for rotating said bin continually about said axis in a given direction,
a multiple of tubular cells of rectangular cross-section arranged in said compartments and maintained there substantially by centrifugal force,
a plurality of records arranged in each cell and each capable of bearing information or data,
each of said cells bearing magnetic identifying indicia,
means arranged adjacent said rotating bin for sensing the identity of each cell,
means responsive to said sensing means for drawing a selected cell inwardly,
each of said cells having axially aligned pins on said interior facing surface,
an interrupted ovoid track assembly arranged internally of said bin to accommodate said pins of a cell,
means arranged internally of said bin adjacent said track assembly and above said cell for reading from and writing on a selected strip arranged at a handling station, a standing station along said track prior to said translating station,
a selected cell being moved into said standing station by the action of tangential force as the cell moves along the track,
a resting station beyond said translating station along said track of said track assembly,
means for arresting said selected cell at said standing station and for moving it into said translating station and said resting station,
a cell restoring arm assembly,
pins for actuating said cell restoring arm assembly on said bin at each cell location,
means for identifying a cell at said resting station,
means for comparing the identities of said cell at said resting station and the compartment from which that all was withdrawn for setting said pins on said bin corresponding to said cell to be returned,
said arm having a camming surface thereon contacting said pin and serving to accelerate the arm gradually from zero to full bin speed,
said arm having another camming surface guiding said cell into alignment with a compartment of said rotating bin, and
said arm having a further camming surface for droping said pin and removing the driving force as said cell is forced into said compartment by movement of the bin and the shape of said track assembly,
said cell being returned to its place in said bin by centrifugal force.

7. A direct access data storage, comprising
a generally annuloidal bin having rectangular compartments arranged radially and opening into the internal bore of the bin for storing cells,
each of said cells being arranged for storing a plurality of records,
a data translating station having means for locating, withdrawing, translating and replacing a record from a cell and located within said bore,
means for continuously rotating said bin about the cylindrical axis thereof and about said data translating station, and
means within said bore, while said bin is continuously rotating, for conveying a cell from said bin to said translating station and from said translating station back to said bin.

8. A direct access data storage as defined in claim 7, and wherein,
said conveying means comprises a track.

9. A direct access data storage as defined in claim 7, and wherein
the propelling force for conveying a cell to said translating station and back to said bin is derived from the rotation of said bin.

10. A direct access data storage as defined in claim 7, and wherein
said conveying means comprises
an arm,
arm engaging means on said bin, and
means gradually accelerating said arm from standstill to an angular velocity substantially synchronous with that of said bin.

11. A direct access data storage as defined in claim 10, and wherein
said accelerating means comprises a camming surface on said arm.

12. A direct access data storage as defined in claim 7, and incorporating
a standing station preceding said translating station, and
means for shifting a cell from said standing station to said translating station.

13. A direct access data storage as defined in claim 12, and wherein
said shifting means comprises a pair of belts lightly gripping said cell and permitting slippage on said cell being detented.

14. A direct access data storage as defined in claim 12, and incorporating a resting station preceding said translating station, and a latch is provided in said arm to permit removing a cell from said translating station to said resting station.

References Cited

UNITED STATES PATENTS 3,176,279 3/1965 Lin et al. ---------- 340—174.1

BERNARD KONICK, *Primary Examiner.*

B. HALEY, *Assistant Examiner.*